Dec. 26, 1944.  T. P. HIGNETT  2,365,702
EXTRACTING ALUMINA
Filed March 6, 1944
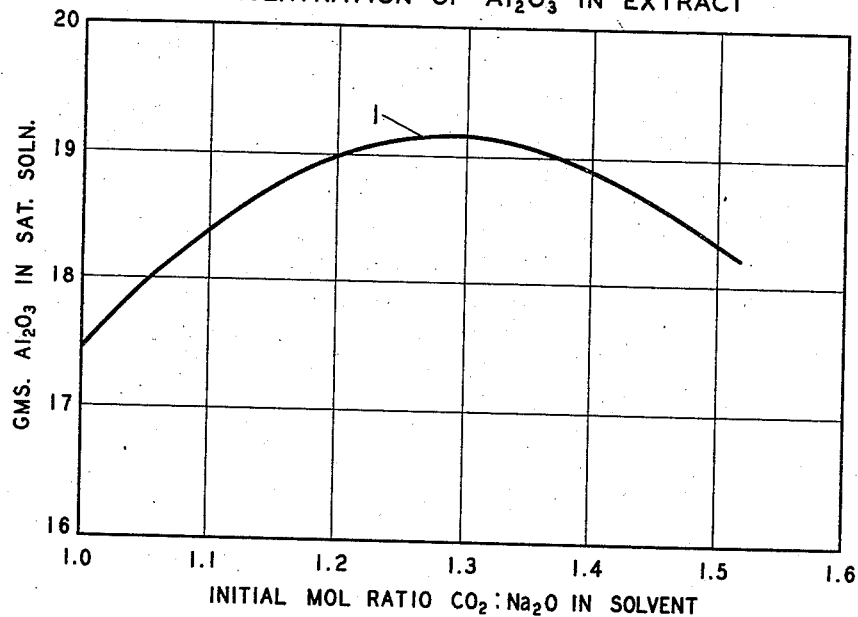
Travis P. Hignett
INVENTOR
BY *Arthur L. Davis*
ATTORNEY Patented Dec. 26, 1944

2,365,702

UNITED STATES PATENT OFFICE 2,365,702

EXTRACTING ALUMINA

Travis P. Hignett, near Sheffield, Ala., assignor to Tennessee Valley Authority, a corporation of the United States of America Application March 6, 1944, Serial No. 525,279

5 Claims. (Cl. 23—141)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a process for the production of alumina from high silica content raw material, particularly where the alumina content thereof has been rendered soluble by the sintering or fusing of the material with lime to produce soluble calcium aluminates therefrom.

The principal object of the present invention is to provide a process wherein aqueous solutions containing high concentrations of alumina may be produced from sintered or fused soluble calcium aluminates under conditions such that a very small proportion of silica is retained in the resulting extract. Another object of this invention is to provide a process for the production of aluminum hydroxide wherein all or substantially all of the aluminum hydroxide in solution is removed therefrom at one time. Still another object of this invention is to provide a cyclic process wherein the aqueous solvent used for the extraction of alumina from sintered or fused calcium aluminates may be completely regenerated at the time the aluminum hydroxide is removed from the solution and thereby made directly available for the extraction of additional portions of material. Other objects of this invention include the provision of a method for the economical recovery of a very high percentage of the alumina with low silica content from low grade aluminous materials of very high silica content.

It has been proposed that high grade ores, that is, those with a high alumina and low silica content, be sintered or fused with lime to produce calcium silicate and monocalcium aluminate, the alumina in the latter being in a soluble condition. It has also been proposed that for the treatment of low grade ore, that is, material with a low alumina and high silica content, the proportions of lime used in the sintering or fusing operation be such as to avoid the production of calcium-aluminum silicates but produce calcium silicate and the predominating aluminate corresponding to the formula $5CaO.3Al_2O_3$, this latter compound also containing alumina in a soluble form. Various solvents have been proposed to extract the soluble alumina from the calcium aluminates indicated above, including aqueous solutions of sodium carbonate, sodium hydroxide, or a solution containing sodium carbonate and a small proportion of sodium hydroxide.

The present invention is directed to a process for producing aluminum hydroxide which is low in silica from sintered or fused materials containing lime, alumina and a relatively high percentage of silica which includes the step of extracting such a sintered or fused material with an aqueous solution containing sodium carbonates, a substantial proportion of which is in the form of sodium bicarbonate.

In the accompanying drawing which forms a part of the specification, the figure shows graphically the relationship between the concentration of $Al_2O_3$ in grams per liter in the extract and the mol ratio of $CO_2$ to $Na_2O$ in the solvent used to produce such extract. Curve 1 shows a substantial increase in the concentration of alumina obtainable by the use of aqueous sodium carbonate-sodium bicarbonate solutions of initial mol ratio of $CO_2$ to $Na_2O$ up to 1.3 over that obtainable by the use of an aqueous sodium carbonate solution alone.

An example is given for the operation of the process of the present invention for the extraction of alumina from a relatively low grade clay containing, on an ignited basis, 44.5% $Al_2O_3$ and 51.0% $SiO_2$. The finely divided clay and limestone in proportion such as to form calcium silicate and the predominating calcium aluminate, $5CaO.3Al_2O_3$, was intimately mixed and the charge so prepared fed to a rotary kiln 40 feet long and 30 inches inside diameter, oil-fired, and adjusted to give a flame 10 to 12 feet long. The kiln was operated at 0.5 R. P. M., and at this speed, the average time of passage through the kiln is estimated to be three hours. The temperature of the sinter in the hottest part of the kiln was held between 1380 and 1390° C. The sintered product discharged from the kiln in the form of flattened balls or rolls of from two to eight inches in diameter was placed on heavy horizontal screens and allowed to cool for about three hours. During this period most of the sintered material disintegrated into finely divided particles and thereafter was fed to a 20-mesh screen. A portion of the material passing through the 20-mesh screen was agitated for approximately thirty minutes at a temperature of 50° C. with an aqueous solution of sodium carbonates equivalent to 3% by weight of $Na_2CO_3$, wherein there was a substantial proportion of sodium bicarbonate, the mol ratio of the $CO_2$ to $Na_2O$ in the solution being 1.3. In order to somewhat simulate direct countercurrent extraction, the first portion of the finely divided sinter was treated with a sufficient quantity of the aqueous solution of sodium carbonates to provide for substantially complete dissolution of all of the alumina therein with the result that the weight ratio of $Al_2O_3$ to $Na_2O$ in the resulting extract was less than one. This initial extract was then treated with a second portion of the finely divided sinter in order to obtain saturation of the solvent in respect to alumina, and the solid material separated from the second extraction was ready for subsequent treatment with fresh solvent. The saturated extract contained 19 grams of $Al_2O_3$ per liter of solution and had a weight ratio of $Al_2O_3$ to $Na_2O$ of 1.1. The alumina in the sodium aluminate extract so prepared was separated by absorbing $CO_2$ therein until all of the alumina therein had been precipitated from the extract as aluminum hydroxide, and the mol ratio of $CO_2$ to $Na_2O$ in the solvent had been increased to 1.3. The precipitated aluminum hydroxide was separated from the regenerated solvent so prepared, and this solvent was ready for use in the extraction of alumina from additional portions of finely divided sinter. The aluminum hydroxide so separated was washed and ignited, and the resulting alumina contained 0.05% by weight of $SiO_2$.

The aqueous solvent of the present invention consists essentially of a solution of sodium carbonate and sodium bicarbonate. As shown in the drawing, the amount of sodium bicarbonate present may vary over a considerable range corresponding to a ratio of $CO_2$ to $Na_2O$ of 1.1 to 1.4, with the preferred ratio being 1.2 to 1.3. Sodium carbonate solutions containing an equivalent of 2.0 to 5.5% of $Na_2CO_3$ have been used but with the preferred concentration being of the order of 3.0 to 4%. A single extraction of finely divided sintered or fused material may be employed, but it is preferable from both the standpoint of increasing the alumina content of the extract and also reducing the silica content thereof that countercurrent, or at least stepwise, extraction methods be employed. The alumina in the resulting extract may be seeded with previously prepared aluminum hydroxide, but the subsequent crystallization of aluminum hydroxide therefrom is relatively slow and not complete. It is preferred that the alumina in the sodium aluminate extract be precipitated by the addition of carbon dioxide to the extract at least to the extent that the ratio of the $CO_2$ to $Na_2O$ in the liquid is slightly greater than one, although it is preferable that the ratio corresponding to that required for reuse as the aqueous solvent be established at this point rather than after the separation of the precipitated aluminum hydroxide from the filtrate. Likewise, it may be necessary to add from time to time a small amount of sodium carbonate to make up for mechanical loss which may occur in such a cyclic process. The precipitated aluminum hydroxide so separated is washed to remove mother liquor therefrom, and thereafter calcined to produce a high grade, low silica alumina particularly suitable for the electrolytic production of aluminum therefrom.

It will be seen, therefore, that this invention actually may be carried out by the use of various modifications and changes without departing from its spirit and scope.

I claim:

1. A process of producing aluminum hydroxide with low-silica content from sintered or fused materials containing lime, alumina and a relatively high silica content, which comprises the step of (a) extracting such a sintered or fused material with an aqueous solution containing chiefly sodium carbonates, a substantial proportion of which is in the form of sodium bicarbonate.

2. A process of producing aluminum hydroxide with low-silica content from sintered or fused materials containing lime, alumina and a relatively high silica content, which comprises the step of (a) extracting such a sintered or fused material with an aqueous solution containing chiefly sodium carbonates wherein the mol ratio of $CO_2$ to $Na_2O$ is 1.1 to 1.4.

3. A process of producing aluminum hydroxide with low silica content from sintered or fused materials containing lime, alumina and a relatively high silica content, which comprises the step of (a) extracting such a sintered or fused material with an aqueous solution containing chiefly sodium carbonates wherein the mol ratio of $CO_2$ to $Na_2O$ is 1.1 to 1.4, and the $Na_2O$ content thereof is equivalent to 2.0 to 5.5 per cent by weight of $Na_2CO_3$.

4. A process of producing aluminum hydroxide with low silica content from sintered or fused materials containing lime, alumina, and a relatively high silica content, which comprises (a) extracting such a sintered or fused material with an aqueous solution containing chiefly sodium carbonates, a substantial portion of which is in the form of sodium bicarbonate,
   (b) treating the extract with carbon dioxide in an amount sufficient to precipitate substantially all of the aluminum hydroxide therefrom and regenerate the aqueous solvent solution of step (a) of the process defined herein,
   (c) separating the precipitated aluminum hydroxide and the aqueous solvent so regenerated, and
   (d) extracting another portion of the sintered or fused material with the regenerated aqueous solvent so separated.

5. A process of producing aluminum hydroxide with low silica content from sintered or fused materials containing lime, alumina and a relatively high silica content, which comprises (a) extracting such a sintered or fused material with an aqueous solution containing chiefly sodium carbonates wherein the mol ratio of $CO_2$ to $Na_2O$ is 1.2 to 1.3, and the $Na_2O$ content thereof is equivalent to 3.0 to 4.0 per cent by weight of $Na_2CO_3$,
   (b) treating the extract with carbon dioxide in an amount sufficient to precipitate substantially all of the aluminum hydroxide therefrom and regenerate the aqueous solvent solution of step (a) of the process defined herein,
   (c) separating the precipitated aluminum hydroxide and the aqueous solvent so regenerated, and
   (d) extracting another portion of the sintered or fused material with the regenerated aqueous solvent so separated.

TRAVIS P. HIGNETT.